United States Patent
Wu et al.

(10) Patent No.: US 8,112,084 B2
(45) Date of Patent: Feb. 7, 2012

(54) METHOD, SYSTEM AND APPARATUS FOR PERFORMING MOBILE INTERNET PROTOCOL DEREGISTERING

(75) Inventors: Jianjun Wu, Shenzhen (CN); Huiwu Shi, Shenzhen (CN); Zhengfei Xiao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 825 days.

(21) Appl. No.: 12/106,162

(22) Filed: Apr. 18, 2008

(65) Prior Publication Data

US 2008/0316962 A1 Dec. 25, 2008

Related U.S. Application Data

(63) Continuation of application No. PCT/CN2006/002775, filed on Oct. 19, 2006.

(30) Foreign Application Priority Data

Oct. 19, 2005 (CN) .......................... 2005 1 0112881

(51) Int. Cl.
| | |
|---|---|
| H04W 4/00 | (2009.01) |
| H04W 72/00 | (2009.01) |
| H04M 1/663 | (2006.01) |
| H04M 11/00 | (2006.01) |
| H04M 3/42 | (2006.01) |
| H04B 1/38 | (2006.01) |
| H04L 12/66 | (2006.01) |
| G06F 15/16 | (2006.01) |

(52) U.S. Cl. ...................... 455/435.1; 370/329; 370/341; 370/352; 455/412.2; 455/450; 455/403; 455/561; 455/525; 709/206; 709/227; 709/203; 379/204.01

(58) Field of Classification Search ............... 455/435.1; 370/329
See application file for complete search history.

(56) References Cited

U.S. PATENT DOCUMENTS

| | | | |
|---|---|---|---|
| 7,366,136 B1 | 4/2008 | Kalbag et al. | |
| 7,395,336 B1 | 7/2008 | Santharam et al. | |
| 2004/0128345 A1 | 7/2004 | Robinson et al. | |
| 2004/0203763 A1* | 10/2004 | Tammi ....................... | 455/435.1 |

(Continued)

FOREIGN PATENT DOCUMENTS

CN 1582050 A 2/2005

(Continued)

OTHER PUBLICATIONS

English translation of the Written Opinion from the International Authority in International Patent Application No. PCT/CN2006/002775 (Jan. 25, 2007).

(Continued)

Primary Examiner — Dwayne Bost
Assistant Examiner — Timothy Pham
(74) Attorney, Agent, or Firm — Leydig, Voit & Mayer, Ltd.

(57) ABSTRACT

A method, a system and an apparatus for performing mobile Internet protocol deregistering, includes that the network element in the ASN to which the terminal attaches detects whether the MS terminates unconventionally, and sends the message with the MS identifier of the MS which terminates unconventionally to the ASN GW/DP. The ASN GW/DP instructs the ASN GW/FA to release the link resource with the MS and release the link resource with the HA proving service for the MS.

19 Claims, 2 Drawing Sheets

U.S. PATENT DOCUMENTS

| | | | |
|---|---|---|---|
| 2004/0234060 A1 | 11/2004 | Tammi et al. | |
| 2005/0107109 A1 | 5/2005 | Gunaratnam et al. | |
| 2005/0281269 A1* | 12/2005 | Choi | 370/395.2 |
| 2006/0019708 A1 | 1/2006 | Raman et al. | |
| 2006/0056396 A1* | 3/2006 | Chao et al. | 370/352 |

FOREIGN PATENT DOCUMENTS

| | | |
|---|---|---|
| JP | 2005045645 A | 2/2005 |
| WO | WO 2004/089023 | 10/2004 |
| WO | WO 2005/048626 A1 | 5/2005 |

OTHER PUBLICATIONS

*Draft IEEE Standard for Local and Metropolitan Area Networks: Part 16: Air Interface for Fixed and Mobile Broadband Wireless Access Systems* (IEEE P802.16e/D10), Aug. 2005, The Institute of Electrical and Electronics Engineers, Inc., New York, New York.

Glass, S., et al., *Registration Revocation in Mobile IPv3*, (RFC3542), Aug. 2003, The Internet Society, Geneva, Switzerland.

*IEEE Standard for Local and Metropolitan Area Networks: Part 16: Air Interface for Fixed and Mobile Broadband Wireless Access Systems*, (IEEE P802.16d-2004), Oct. 2004, The Institute of Electrical and Electronics Engineers, Inc., New York, New York.

Written Opinion of the International Searching Authority in corresponding PCT Application No. PCT/CN2006/002775 (Jan. 25, 2007).

International Search Report in corresponding PCT Application No. PCT/CN2006/002775 (Jan. 25, 2007).

"Revisions to Stage 2 Network Reference Model Section," WiMAX Forum Network Working Group, WiMAX, Beaverton, Oregon.

"WiMAX End-to-End Network Systems Architecture (Stage 2: Architecture Tenets, Reference Model and Reference Points)," WiMAX Forum Proprietary, Dec. 15, 2005, WiMAX, Beaverton, Oregon.

Image File Wrapper in corresponding U.S. Appl. No. 12/832,791.

\* cited by examiner

METHOD, SYSTEM AND APPARATUS FOR PERFORMING MOBILE INTERNET PROTOCOL DEREGISTERING

CROSS-REFERENCE TO RELATED APPLICATIONS

This application is the continuation of International Patent Application No. PCT/CN2006/002775, filed on Oct. 19, 2006, which claims priority to Chinese Patent Application No. 200510112881.7, submitted with the State Intellectual Property Office of P.R.C. on Oct. 19, 2005, entitled "Method, System and Apparatus for Realizing Mobile Internet Protocol Deregistering," both the contents of which are hereby incorporated by reference in their entirety.

FIELD OF THE INVENTION

The present invention relates to the mobile Internet protocol (MIP) in the communication network field, and more particularly, to a method, system and apparatus for performing MIP deregistering.

BACKGROUND OF THE INVENTION

The Internet workgroup develops the MIP for implementing that a terminal may transmit information via the Internet protocol (IP) link. The MIP provides an IP routing mechanism for the terminal. With the mechanism, the terminal supporting MIP may be connected to any link with a preset terminal identifier. The terminal supporting MIP may change the location without interrupting the information transmission via links or restarting. The following description takes a mobile station (MS) as the terminal for example.

Currently, there are two techniques for the MS to support the MIP. One is called the client mobile Internet protocol (CMIP) technique which integrates the MIP function into the MS. The MIP registering/MIP deregistering procedure of the MS are both initiated by the MS. Another technique is called the proxy mobile Internet protocol (PMIP) technique which sets the MIP function in a proxy mobile node of an access service network (ASN) to which the MS attaches. The MIP registering/MIP deregistering procedure of the MS are both initiated by the proxy mobile node.

No matter the CMIP technique or the PMIP technique is used by the MS to perform the MIP registering/MIP deregistering procedure, there is a need to establish a security association between an entity with the MIP function and a home agent (HA) providing service for the MS. When the MS uses the CMIP technique, the entity with the MIP function is the MS. When the MS uses the PMIP technique, the entity with the MIP function is the proxy mobile node.

When the MS using the CMIP technique performs the MIP registering/MIP deregistering procedure, the MS initiates an MIP registering request/an MIP deregistering request which carries security association information to the HA via an access service network gateway/foreign agent (ASN GW/FA) of the ASN to which the MS attaches. The HA authenticates the security association information carried by the request. If the authentication succeeds, the HA establishes/releases link resource between the HA and the MS. The link passes the ASN GW/FA of the ASN to which the MS attaches. If the authentication fails, the HA performs no operations and returns a request failure response to the MS via the ASN GW/FA of the ASN to which the MS attaches.

When the MS using the PMIP technique performs the MIP registering/MIP deregistering procedure, the proxy mobile node to which the MS attaches initiates the MIP registering request/MIP deregistering request carrying the security association information to the HA via the ASN GW/FA of the ASN. The HA authenticates the security association information carried by the request. If the authentication succeeds, the HA establishes/releases the link resource between the HA and the proxy mobile node. The link passes the ASN GW/FA of the ASN to which the MS attaches. If the authentication fails, the HA performs no operations and returns the request failure response to the proxy mobile node via the ASN GW/FA of the ASN to which the MS attaches.

The MIP deregistering procedure is applied for the MS using the CMIP technique or the PMIP technique and in the normal network exit procedure. The MS performs the MIP deregistering procedure after transmitting the information via the link. However, with regard to the MS which uses the CMIP technique and terminates unconventionally, such as sudden power-off or breaking away from the ASN to which the MS attaches, the MIP deregistering procedure may not be initiated because the MIP deregistering request may not be initiated. Therefore, only when an MIP life cycle set for the MS by the HA decreases to 0, does the HA automatically initiate the MIP deregistering request for the MS and release the link resource between the HA and the MS. If the MIP life cycle set for the MS by the HA is long, the network side still charges for the MS as the link resource between the MS and the HA has not been released although the MS terminates unconventionally. It is unacceptable to the MS.

Figure 1:
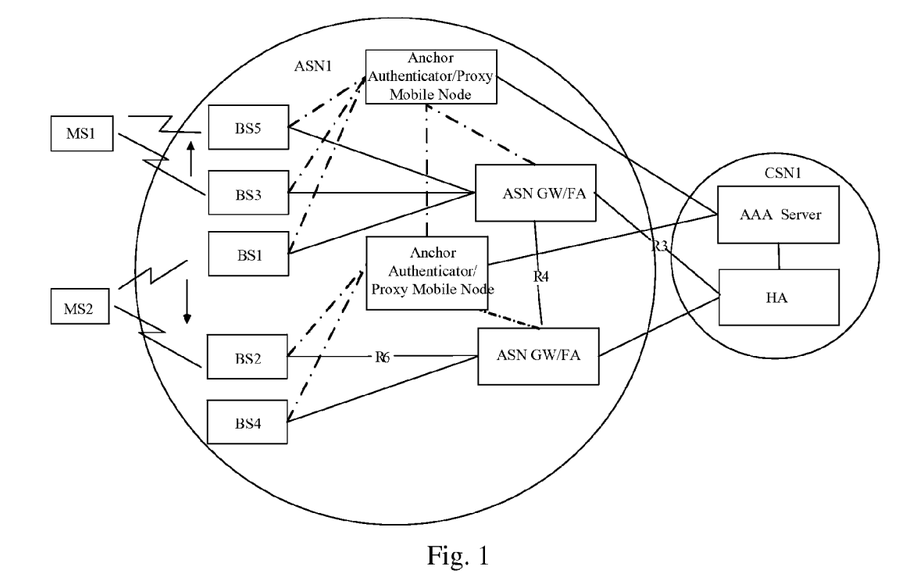
FIG. 1 is a schematic diagram illustrating the architecture of the WiMAX network.

FIG. 1 is a schematic view illustrating the architecture of the worldwide interoperability for microwave access (WiMAX) network. The MS may perform the MIP technique in the WiMAX network. The WiMAX network includes the MS, the ASN, and a connectivity server network (CSN). The ASN includes a base station (BS) to which the MS attaches, an anchor authenticator/proxy mobile node and an ASN GW/FA. The CSN includes an Authentication Authorization and Accounting (AAA) server and the HA. The thick solid lines in FIG. 1 indicate interfaces defined in the WiMAX. The point line indicates logical interfaces undefined in the WiMAX. The thin solid line indicates standard interfaces in the communication network. The broken line indicates air interfaces defined in the Standard 802.16.

When the MS performs the CMIP technique, the MS establishes the link resource between the MS and the HA via the BS to which the MS attaches and the ASN GW/FA. When the MS performs the PMIP technique, the MS establishes link resource between the MS and the HA via the BS to which the MS attaches, an anchor authenticator/proxy mobile node and the ASN GW/FA.

In the WiMAX network, with regard to the MS which uses the CMIP technique and terminates unconventionally, the MIP deregistering procedure may be performed by using an authentication routeway from the HA to the anchor authenticator/proxy mobile node via the AAA server. The specific procedure of the MIP deregistering is that first, when the BS to which the MS attaches has detected an unconventional termination of the MS, the BS sends a notification message of the unconventional termination carrying an MS identifier of the MS to the anchor authenticator/proxy mobile node. Second, according to the MS identifier of the MS, the anchor authenticator/proxy mobile node which has received a notification message determines the HA providing service for the MS. The HA providing service for the MS corresponding to the link may be identified because a corresponding relationship between the MS identifier of the MS and the link resource has been preserved in the anchor authenticator/proxy mobile node when the MS performs the MIP registration. The anchor authenticator/proxy mobile node sends a remote authentication dial in user service (Radius) message carrying the MS identifier of the MS to the AAA server to which the HA attaches. The HA provides service for the MS. Finally, the AAA server retransfers the Radius message to the HA providing service for the MS. The link resource related to the MS is determined by the HA providing service for the MS according to the MS identifier of the MS. The HA providing service for the MS may get the link resource corresponding to the MS because the corresponding relationship between the MS identifier of the MS and the link resource has been pre-served in the HA providing service for the MS when the MS performs the MIP registration. The HA providing service for the MS releases the link resource between the MS and the HA, i.e. the HA releases the link resource between the HA and the MS via the ASN GW/FA and the BS to which the MS attaches, so the MIP deregistering is performed.

In the MIP deregistering procedure in the WiMAX network, there is a need to modify the content of current Radius message which is applied in the charging and authentication for the MS, and modify the software in the AAA server and the HA for the purpose that the AAA server and the HA whose software has been modified may support the modified Radius message, then perform the MIP deregistering procedure according to the modified Radius message. The current Radius message is applied in the charging and authentication for the MS.

In addition, with regard to the MS which uses the PMIP technique and terminates unconventionally in the WiMAX network, the MIP deregistering procedure may be performed by a pre-built security association between the proxy mobile node and the HA. The specific procedure of the MIP deregistering procedure is that first, when the BS to which the MS attaches has detected the unconventional termination of the MS, the BS sends the notification message of the unconventional termination carrying the MS identifier of the MS to the anchor authenticator/proxy mobile node. Second, according to the MS identifier of the MS, the anchor authenticator/proxy mobile node which has received the notification message determines the MS and the HA providing service for the MS, and initiates the MIP deregistering request carrying the security association information of the MS to the HA providing service for the MS via the ASN GW/FA. Finally, the HA providing service for the MS authenticates the security association information carried by the request. If the authentication succeeds, the HA providing service for the MS releases the link resource between the HA and the anchor authenticator/proxy mobile node. The link passes the ASN GW/FA. If the authentication fails, the HA providing service for the MS performs no operations and returns the request failure response to the anchor authenticator/proxy mobile node via the ASN GW/FA.

The MIP deregistering procedure by the security association information in the WiMAX network may perform the MIP deregistering procedure of the MS which uses the PMIP technique and terminates unconventionally. However the MS which uses the CMIP technique and terminates unconventionally may not perform the MIP deregistering by the security association information.

Therefore, a problem to be solved is how to enable the MS using the CMIP technique during the unconventional termination to perform the MIP deregistering, without need of waiting for the end of the life cycle of the MIP set by the MS and modifying the current Radius message.

SUMMARY OF THE INVENTION

A method, system and apparatus are provided in the embodiment of the present invention for performing the MIP deregistering. The MS using the CMIP technique may perform the MIP deregistering during the unconventional termination without need of waiting for the end of the life cycle of the MIP set by the HA for the MS and modifying the existing Radius message.

Furthermore, the method of the present invention may also enable the MS using the PMIP technique to perform the MIP deregistering during the unconventional termination.

According to above objects, the technical solution of the embodiment of the present invention is realized as follows.

A method for performing the MIP deregistering, an access service network gateway/decision point (ASN GW/DP) is set in the ASN to which the terminal attaches, includes:

A, detecting, by a network element in the ASN to which the terminal attaches, the unconventional termination of the terminal and sending the notification message of the unconventional termination carrying a terminal identifier of the terminal to the ASN GW/DP in the ASN to which the terminal attaches;

B, determining, by the ASN GW/DP according to a strategy, whether to release link resource with the terminal identifier of the terminal carried in the received notification message of the unconventional termination, if the ASN GW/DP according to the strategy determines to release the link resource of the terminal, executing step C; if the ASN GW/DP strategy determines not to release the link resource of the terminal, performing no operation and ending the current procedure; and C, instructing, by the ASN GW/DP, the ASN GW/FA to release the link resource allocated to the terminal and between the ASN GW/FA and the HA providing service for the terminal and to release the link resource between the ASN GW/FA and the terminal respectively.

A system for performing the MIP deregistering is provided. The system includes the ASN GW/DP, the ASN GW/FA, the network element in the ASN to which the terminal dominated by the network element in the ASN attaches and the HA.

The ASN GW/FA is respectively connected to the ASN GW/DP and the network element in the ASN to which the terminal dominated by the network element in the ASN attaches respectively. A message interaction is performed between the network element in the ASN to which the terminal dominated by the network element in the ASN attaches and the ASN GW/FA. The message interaction is performed between the ASN GW/FA and the HA. The system is adapted for sending the notification message of the unconventional termination which carries the terminal identifier of the terminal to the ASN GW/DP when the network element in the ASN to which the terminal dominated by the network element in the ASN attaches has detected the unconventional termination of the terminal. When the ASN GW/DP which has received the notification message determines whether to release the link resource related to the terminal according to the preset algorithm strategy, the ASN GW/DP instructs the ASN GW/FA to release the link resource allocated to the terminal and between the ASN GW/FA and the HA providing service for the terminal and to release the link resource between the ASN GW/FA and the terminal respectively.

An apparatus for performing the MIP deregistering is provided. The apparatus at least includes the ASN GW/DP adapted to send the notification message of the unconventional termination which carries the terminal identifier of the terminal to the ASN GW/DP in the apparatus if an ASN network element dominating the terminal has detected unconventional termination of the terminal and instructs the ASN GW/FA to release the link resource allocated to the terminal and between the ASN GW/FA and the HA providing service for the terminal and to release the link resource between the ASN GW/FA and the terminal when the ASN GW/DP in the apparatus which has received the notification message determines to release the link resource related to the terminal according to the preset algorithm strategy.

It may be seen from the above solution that the dominator of the method provided in the embodiment of the present invention is the ASN GW/DP. According to the MS identifier of the MS which terminates unconventionally, the dominator instructs the ASN GW/FA to release the link resource between the ASN GW/DP and the MS and to release the link resource allocated to the MS and between the MS and the HA providing service for the MS. Therefore, without need of waiting for the end of the life cycle of the MIP set by the HA for the MS and modifying the content of the existing Radius message or the software in the AAA server or in the HA, the embodiment of the present invention enables the MS using the CMIP technique to perform the MIP deregistering during the unconventional termination. The method provided in the embodiment of the present invention is also adopted for the MS using the PMIP technique to perform the MIP deregistering during the unconventional termination.

DETAILED DESCRIPTION OF THE PREFERRED EMBODIMENTS

In order to make the objects, technical solutions and merits of this invention clearer, a further detailed description for the present invention is given as follows in conjunction with the embodiments and accompanying drawings.

Taking the MS using the CMIP technique for example, when the MS using the CMIP technique terminates unconventionally, the embodiment of this invention adds the conventional ASN GW/DP into the ASN network to which the MS attaches to perform the MIP deregistering of the MS. The ASN GW/DP in the embodiment of the present invention may be located in the serving ASN GW which is connected to the BS of the MS, alternatively located in the anchor authenticator (the entity in the ASN adapted for producing and distributing the anchor secret key for the MS) which serves the MS; and also alternatively located in the service flow authorization (SFA) which is adapted for the control of service flow controlling plane in the WiMAX network. The SFA entity may be integrated in the ASN GW/FA or may also be set separately performing message interaction with the ASN GW/FA. In the ASN, the ASN GW/DP is respectively connected to the BS, the anchor authenticator and the ASN GW/FA. The ASN GW/FA entity also includes an anchor data path function which serves the terminal, and it is only described as the ASN GW/FA in the following descriptions.

If the ASN GW/FA of the ASN includes an anchor ASN GW/FA and a serving ASN GW providing service for the MS, the ASN GW/DP may be integrated in the anchor ASN GW/FA or the serving ASN GW. The anchor ASN GW/FA mentioned here is adapted for dominating several serving ASN GW which are connected with the HA via the anchor ASN GW/FA.

The method provided in the embodiment of the present invention is that first, when the BS to which the MS attaches has detected the unconventional termination of the MS, the BS sends a notification message of the unconventional termination which carries the MS identifier of the MS to the ASN GW/DP in the ASN to which the MS attaches. Second, according to the preset algorithm strategy, the ASN GW/DP which has received the message determines whether to remove the link between the MS and the HA providing service for the MS via the ASN GW/FA, i.e. to release the link resource related to the MS. If the ASN GW/DP determines to release the link resource of the MS, the ASN FW/DP instructs the ASN GW/FA to release the link resource allocated to the MS and between the ASN GW/FA and the HA providing service for the MS and to release the link resource between the ASN GW/FA and the MS respectively; if the ASN GW/DP determines not to release the link resource of the MS, the ASN FW/DP instructs the ASN GW/FA not to release the link resource between the MS and the HA providing service for the MS via the ASN GW/FA, and the current procedure ends.

According to standard practice, when the MS performs the MIP registering, the ASN GW/DP stores the corresponding relationship between the MS identifier and the link resource of the MS, and the ASN GW/DP may determine the link resource related to the MS according to the MS identifier. Similarly, according to standard practice, when the MS performs the MIP registering, the ASN GW/FA and the HA providing service for the MS in the present invention also stores the corresponding relationship between the MS identifier and the link resource of the MS, and the ASN GW/FA and the HA providing service for the MS may determine the link resource related to the MS. The link resource of the MS includes the information of the HA providing service for the MS, the serving ASN GW in the ASN to which the MS attaches, the information of the anchor ASN GW/FA in the ASN to which the MS attaches and the related data path message and so on.

Figure 2:
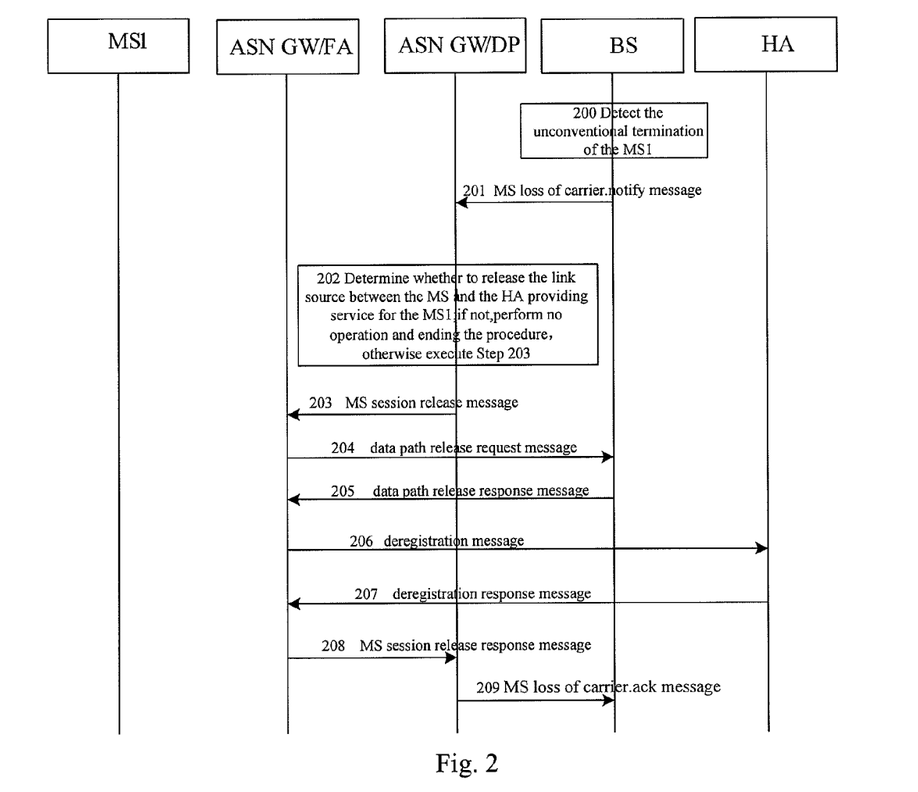
FIG. 2 is a flowchart illustrating a method for the MS using the CMIP technique during the unconventional termination to perform the MIP deregistering in the WiMAX network in accordance with the embodiment of the present invention.

FIG. 2 is a flowchart illustrating a method for the MS using the CMIP technique during the unconventional termination performing the MIP deregistering in the WiMAX network in accordance with the embodiment of the present invention. Suppose that the MS which uses the CMIP technique and terminates unconventionally is the MS1, the specific steps are as follows.

Step 200: The BS to which the MS currently attaches detects the MS1 terminates unconventionally.

The BS to which the MS currently attaches may adopt the air interface detection mechanism defined in the IEEE802.16d/e to detect the MS1 terminates unconventionally.

Step 201: The BS to which the MS1 currently attaches sends an MS loss of carrier notify message which carries the MS identifier of the MS1 to the ASN GW/DP. In this step, considering the combination with the releasing process of the data path, the BS to which the MS1 currently attaches sends a data path de-registration request message which carries the releasing reason of the MS unconventional termination to the ASN GW/DP.

Step 202: According to the preset algorithm strategy, the ASN GW/DP which has received the MS loss of carrier.notify message determines whether to release the link resource between the MS1 and the HA providing service for the MS1.

If the ASN GW/DP determines not to release the link resource, the ASN GW/DP performs no operations, and the current procedure ends; if the ASN GW/DP determines to release the link resource, step 203 is executed.

The preset algorithm strategy may be whether the ASN GW/DP has received the MIP registering request in the set time. The MIP registering request is initiated again by the MS1 with the identifier carried by the MS loss of carrier.notify message via the BS, i.e. the BS which has detected the unconventional termination of the MS1. If the ASN GW/DP has received the MIP registering request, the ASN GW/DP should not release the link resource between the MS1 and the HA providing service for the MS. If the ASN GW/DP does not receive the MIP registering request prior the expiration of the set timer, the ASN GW/DP releases the link resource between the MS1 and the HA providing service for the MS.

Step 203: The ASN GW/DP sends an MS session release request message which carries the MS identifier of the MS1 and the releasing reason to the ASN GW/FA. The specific releasing reason may be the terminal loss of carrier.

Steps 204-205: When the MS1 performs the MIP registering, the corresponding relationship between the MS identifier and the link resource of the MS1 is stored in the ASN GW/FA. According to the MS identifier of the MS1, the ASN GW/FA determines the link allocated to the MS1 and between the MS1 and the BS to which the MS1 attaches, i.e. the link R6. The ASN GW/FA releases the link resource, and sends a data path release request message to the BS to which the MS1 attaches. The data path release request message carries the MS identifier of the MS1 and the related data path message related of the MS1. The related data path message is obtained from the link resource of the MS identifier of the MS1 stored in the ASN GW/FA. After receiving the data path release request message, according to the MS identifier of the MS1 and the related data path message of the MS1 carried in the data path release request message, the BS to which the MS1 attaches determines the link allocated to the MS1 and between the ASN GW/FA, i.e. the link R6, and releases the link resource.

After releasing the link resource, the BS to which the MS1 attaches sends a data path release response message to the ASN GW/FA. After receiving the data path release response message from the BS to which the MS1 attaches, the ASN GW/FA further implements three-way handshake and replies a data path release acknowledge message to the service BS.

If the ASN GW/FA in the WiMAX network includes an anchor ASN GW/FA and a serving ASN GW providing service for the MS1, the method further includes following steps. According to the MS identifier of the MS1, the serving ASN GW determines the link allocated to the MS1 and between the MS1 and the anchor ASN GW/FA, i.e. the link R4, releases the link resource and sends a data path release request message which carries the MS identifier of the MS1 to the anchor ASN GW/FA. After receiving the data path release request message, according to the MS identifier of the MS1, the anchor ASN GW/FA determines the link allocated to the MS1 and between the MS1 and the serving ASN GW, i.e. the link R4 and releases the link resource.

After releasing the link resource, the anchor ASN GW/FA sends a data path release response message to the serving ASN GW. After receiving the message, the serving ASN GW further implements three-way handshake and replies a data path release acknowledge message to the anchor the ASN GW/FA.

The process of releasing the link R4 between the anchor ASN GW/FA and the serving ASN GW in the above steps may also be a releasing process initiated by the anchor ASN GW/FA.

The above steps may also be executed after releasing the link resource R3, i.e. after steps 206-207, or step 208.

Steps 206-207: According to the MS identifier of the MS1, the ASN GW/FA determines the link allocated to the MS1 and between the MS1 and the HA providing service for the MS1, i.e. the link R3, releases the link resource and sends a registration revocation message which carries the MS identifier of the MS to the HA providing service for the MS1. After receiving the registration revocation message, according to the MS identifier of the MS1 carried in the message, the HA providing service for the MS1 determines the link allocated to the MS1 and between the ASN GW/FA and the MS1, i.e. the link R3 and releases the link.

After releasing the link resource, the HA providing service for the MS1 sends a registration revocation acknowledgement message to the ASN GW/FA.

If the ASN GW/FA in the WiMAX network includes an anchor ASN GW/FA and a serving ASN GW, the ASN GW/DP sends an MS session release request message which carries the MS identifier of the MS1 to the anchor ASN GW/FA via the serving ASN GW. After receiving the MS session release request message, the anchor ASN GW/FA executes steps 206-207. The anchor ASN GW/FA replies an MS session release response message to the serving ASN GW after executing steps 206-207.

In steps 206-207, as the releasing reason carried in the MS session release request message of the ASN GW/DP received by the ASN GW/FA is the terminal unconventional termination, in step 206, the ASN GW/FA may set the I bit in the registration revocation message to inform that there is no need to notice the MS of the revocation event. The registration revocation message defined by the IETF RFC3543 is sent to the HA.

Step 208: After receiving the data path release response message sent by the BS to which the MS1 attaches and the registration revocation acknowledgement message sent by the HA providing service for the MS1 (If the link resource between the ASN GW/FA and the BS has not been triggered, the embodiment of the present invention need not to wait for the data path release response message sent by the BS to which the MS1 attaches), the ASN GW/FA sends the MS session release response message which carries the MS identifier of the MS1 to the ASN GW/DP. The MS identifier indicates that the link resource allocated to the MS1 and between the ASN GW/FA and the HA providing service for the MS1 has been completely released, and it may also indicate that the link resource between the MS1 and the ASN GW/FA via the BS to which the MS1 attaches has been completely released.

If the ASN GW/FA in the WiMAX network includes an anchor ASN GW/FA and a serving ASN GW, the serving ASN GW sends the data path release response message to the anchor after receiving the data path release response message sent by the BS to which the MS1 attaches; The serving ASN GW sends the MS session release response message to the anchor ASN GW/FA after receiving the MS session release response message; The MS session release response message carries the MS identifier if the MS1 which indicates the link resource allocated to the MS1 and between the ASN GW/FA and the HA providing service for the MS1 has been released, and which may also indicate the link resource from the MS1 to the ASN GW/FA via the BS to which the MS1 attaches.

Step 209: The ASN GW/DP which has received the MS session release response message sends the MS loss of carrier.ack message which carries the MS identifier of the MS1 to the BS to which the MS1 attaches, which indicates that the MS1 using the CMIP technique has performed the MIP deregistering during the unconventional termination. In this step, considering the combination with the releasing process of the data path, the ASN GW/DP to which the MS1 attaches sends a data path de-registration response message which carries the MS identifier of the MS to the BS to which the MS1 attaches, which indicates that the MS1 using the CMIP technique has performed the MIP deregistering during the unconventional termination.

Step 209 may also be the three-way handshake. The ASN GW/DP which has received the MS session release response message sends an MS loss of carrier.rsp message which carries the MS identifier of the MS1 to the BS to which the MS1 attaches, which indicates that the MS1 using the CMIP technique performs the MIP deregistering during the unconventional termination. The BS to which the MS1 attaches returns an MS loss of carrier.ack message demonstrating that the MS loss of carrier.rsp message has been received. Similarly in this step, considering the combination with the release process of the data path, the BS to which the MS1 attaches returns a data path de-registration acknowledgement message after sending the data path de-registration response message to the BS to which the MS1 attaches by the ASN GW/DP to which the MS1 attaches, and the releasing process is performed.

The steps 204-205 may be executed now if they have not been executed.

If the processes in step 201 and step 209 and in step 203 and step 208 in the embodiment of the present invention are associated with the release processes of their own data path, step 204 and step 205 may be omitted in the embodiment.

The MS identifier in the embodiment of the present invention may be the IP address of the MS.

With regard to the embodiment of the present invention illuminated in the FIG. 2, if the ASN GW/DP is located in the serving ASN GW connected to the service BS of the MS1, step 203 and step 208 may be accompanying the link R4 release procedure between the serving ASN GW and the anchor ASN GW/FA, i.e. the ASN GW/DP sends the data path de-registration request message which carries the MS identifier of the MS1 and the releasing reason to the ASN GW/FA in step 203. The specific releasing reason may be the terminal loss of carrier. And in step 208, the MS session release response message sent by the ASN GW/FA to the ASN GW/DP is the data path de-registration response message of the link R4 between the ASN GW/FA and the serving ASN GW. The data path de-registration response message carries the MS identifier of the MS1 demonstrating that the link resource allocated to the MS1 and between the ASN GW/FA and the HA providing service for the MS1 has been released completely.

Similarly, the method illustrated in FIG. 2 may make the MS using the PMIP technique perform the MIP deregistering during the unconventional termination. The preset algorithm strategy is whether the ASN GW/DP has received the MIP registering request message initiated again by the MS via the anchor authenticator/proxy mobile node and the related information which is needed to inform the anchor authenticator/proxy mobile node to delete the maintained MS1. The MIP registering request message carries the IP address of the MS.

In the past, when the MS using the CMIP technique terminates unconventionally, the HA is used as the dominator to release the link resource between the MS and the ASN GW/FA when the MIP life cycle set for the MS ends so as to perform the MIP deregistering procedure. Alternatively, the MIP deregistering request may be initiated by the BS to which the MS attaches to the anchor authenticator/proxy mobile node and the anchor authenticator/proxy mobile node sends a Radius message which has been modified to the HA via the AAA server to which the HA attaches. Then the HA is used as the dominator to release the link resource between the ASN GW/FA and the MS so as to perform the MIP deregistering procedure. As shown in FIG. 2, the method provided in the embodiment of the present invention takes the ASN GW/DP as the dominator but not the HA as is conventional. According to the MS identifier of the MS which terminates unconventionally, the dominator instructs the ASN GW/FA to release the link resource between the ASN GW/FA and the MS and to release the link resource allocated to the MS and between the MS and the HA. Therefore, without need of waiting for the end of the life cycle of the MIP set by the HA and modifying the content of the existing Radius message or the software in the AAA server or in the HA, the embodiment of the present invention may enable the MS using the CMIP technique to perform the MIP deregistering during the unconventional termination.

Figure 3:
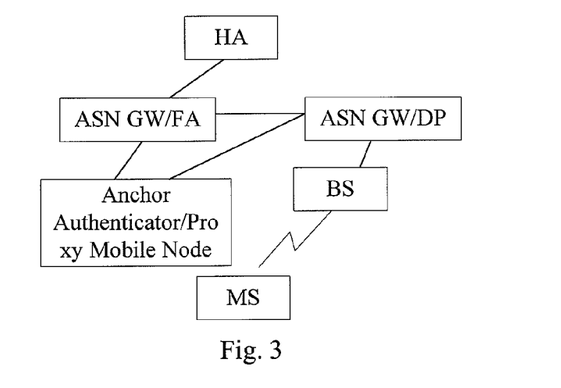
FIG. 3 is a schematic diagram illustrating a system for performing the MIP deregistering by the MS during the unconventional termination in accordance with the embodiment of the present invention.

In the existing solution, although the MIP deregistering procedure may be performed by the anchor authenticator/proxy mobile node via the security association preset between the MS and the HA providing service for the MS when the MS using the PMIP technique terminates unconventionally. When the MS using the PMIP technique terminates unconventionally, the MIP deregistering procedure may also be performed by the method provided in the embodiment of the present invention. The embodiment of the present invention also provides a system for performing the MIP deregistering when the MS terminates unconventionally. As shown in FIG. 3, the system includes an ASN GW/DP, an ASN GW/FA, an BS dominating the MS and an HA.

The ASN GW/FA is connected to the ASN GW/DP and the BS dominating the MS respectively. A message interaction is performed between the BS dominating the MS and the ASN GW/FA; the message interaction is performed between the ASN GW/FA and the HA. The message interaction is adapted for sending the MS loss of carrier.notify message which carries the MS identifier of the MS1 to the ASN GW/DP when the BS dominating the MS has detected the unconventional termination of the MS. When the ASN GW/DP which has received the message determines to release the link resource related to the MS1 according to the preset algorithm strategy, the ASN GW/DP instructs the ASN GW/FA to release the link resource between the ASN GW/FA and the HA providing service for the MS1 and to release the link resource between the ASN GW/FA and the MS1 respectively.

In the embodiment of the present invention, the ASN GW/DP may be set independently and may also be integrated in the ASN GW/FA or in the ASN GW/anchor authenticator. If the ASN GW/FA in the ASN includes an anchor ASN GW/FA and a serving ASN GW providing service for the MS, the ASN GW/DP may be integrated into the anchor ASN GW/FA or into the serving ASN GW (the message interaction is performed between the anchor ASN GW/FA and the serving ASN GW providing service for the MS).

The embodiment of the present invention also includes an anchor authenticator/proxy mobile node which is connected with the ASN GW/DP. The connection is applied to instruct the anchor authenticator/proxy mobile node to release the link resource allocated to the MS and between the ASN GW/FA and the HA providing service for the MS and to release the link resource between the ASN GW/FA and the MS respectively when the ASN GW/DP determines to release the link resource related to the MS according to the preset algorithm strategy after the MS using PMIP technique terminates unconventionally and is adapted to maintain the related information of the MS of its own. Besides, the physical entity in which the anchor ASN GW/FA is located, illustrated in the embodiment of the present invention, also includes a function of anchor DPF of the anchor data path, namely the generally called binding of the Anchor and the FA.

The embodiment of the present invention is also applied in the MIP deregistering procedure initiated by the serving ASN network to which the CMIP terminal attaches. Generally, in the MIP deregistering procedure initiated by the serving ASN network of the CMIP technique terminal, there is a need to inform the MS to initiate the MIP deregistering procedure because the CMIP client is in the terminal MS. If the embodiment of the present invention is used, when the serving ASN network to which the CMIP terminal attaches initiates the MIP deregistering, the anchor ASN GW/FA of the terminal may be informed by the serving ASN network, steps 206-207 in the embodiment of the present invention may be executed by the anchor ASN GW/FA to which the terminal attaches and the mobile IP home agent HA of the terminal.

According to the RFC 3543, the HA sets I bit in the registration revocation acknowledge message replied in step 207 to notify the ASN GW/FA to inform the MS of the revocation event. Then the ASN GW/FA sends an FA broadcast message to the MS accordingly and sets the B bit in the broadcast message to notify the MS to register again. However this FA does not provide the registering service. Generally speaking, the MS needs to find other FA to register, but there is no other choice in the WiMAX, and that is the end of the MIP until the B bit is cleared in the broadcast message sent by the FA.

The embodiment of the present invention also provides an apparatus. The apparatus at least includes an ASN GW/DP adapted for sending an MS loss of carrier.notify message which carries the MS identifier of an MS to the ASN GW/DP in the apparatus when the BS dominating the MS has detected the unconventional termination of the MS. When the ASN GW/DP in the apparatus which has received the message determines whether to release the link resource related to the MS according to the preset algorithm, the ASN GW/DP instructs the ASN GW/FA to release the link resource between the ASN GW/FA and the HA providing service for the MS and to release the link resource between the ASN GW/FA and the MS.

In the embodiment of the present invention, the apparatus may be the ASN GW/FA which may be the serving ASN GW or the anchor ASN GW/FA.

The apparatus also includes an algorithm strategy unit for storing the algorithm strategy and sending the stored algorithm strategy to the ASN GW/DP.

The method, the system and the apparatus provided by the embodiment of this invention may not only be applied in the mobile communication system using the MIP technique. It may also be applied in other communication systems using the MIP technique, e.g. a cable communication system. Here, the MS may be the terminal but not a mobile terminal, and the base station may be the ASN network element to which the terminal attaches. The embodiments of this invention are only explained taking the MS and the base station for the example.

Though illustration and description of the present disclosure have been given with reference to embodiments thereof, it should be appreciated by persons of ordinary skill in the art that various changes in form and detail may be made without deviation from the scope of this disclosure, which are defined by the appended claims.

What is claimed is:

1. A method for performing mobile Internet protocol (MIP) deregistering, wherein an access service network (ASN) to which a terminal attaches comprises an access service network gateway/decision point (ASN GW/DP), the method comprising:

receiving, by the ASN GW/DP, a notification message of an unconventional termination sent by an network element in the ASN to which the terminal attaches and determining, by the ASN GW/DP, whether to release link resource of the terminal; and instructing, by the ASN GW/DP, an access service network gateway/foreign agent (ASN GW/FA) to release the link resource allocated to the terminal and between the ASN GW/FA and a home agent (HA) providing service for the terminal and to release the link resource between the ASN GW/FA and the terminal respectively.

2. The method according to claim 1, wherein the notification message of the unconventional termination carries a terminal identifier of the terminal and a link of the terminal is instructed by the terminal identifier of the terminal.

3. The method according to claim 2, wherein the determining, by the ASN GW/DP, whether to release the link resource of the terminal is:

determining whether to receive a registering request initiated again by the terminal which carries the terminal identifier of the terminal via the network element in the ASN to which the terminal attaches within the set time, if the registering request is not received, determining to release the link source of the terminal.

4. The method according to claim 1, wherein the instructing the ASN GW/FA to release the link resource allocated to the terminal and between the ASN GW/FA and the HA providing service for the terminal is:

sending, by the ASN GW/DP, a terminal session release request message carrying the terminal identifier of the terminal to the ASN GW/FA; and the session release request message is adapted to inform the ASN GW/FA of the terminal unconventional termination, to instruct the ASN GW/FA to determine the link resource allocated to the terminal and between the terminal and the HA providing service for the terminal according to the terminal identifier of the terminal and to release the link resource, to instruct the ASN GW/FA to send a registration revocation message carrying the terminal identifier of the terminal; the registration revocation message is adapted to instruct the HA providing service for the terminal to determine the link allocated to the terminal and between the terminal and the ASN GW/FA according to the terminal identifier of the terminal after receiving the registration revocation message and to release the link resource.

5. The method according to claim 4, wherein the link allocated to the terminal and between the ASN GW/FA and the HA providing service for the terminal is a link R3.

6. The method according to claim 1, wherein, if the ASN GW/FA in the ASN to which the terminal attaches comprises an anchor ASN GW/FA and a serving ASN GW, the instructing the ASN GW/FA to release the link resource allocated to the terminal and between the ASN GW/FA and the HA providing service for the terminal is:

instructing, by the ASN GW/DP, the anchor ASN GW/FA to release the link resource allocated to the terminal and between the anchor ASN GW/FA and the HA providing service for the terminal via the serving ASN GW.

7. The method according to claim 6, wherein the link allocated to the terminal and between the network element in the ASN to which the terminal attaches and the ASN GW/FA is a link R6.

8. The method according to claim 1, wherein, if the ASN GW/FA in the ASN to which the terminal attaches comprises the anchor ASN GW/FA and the serving ASN GW, the process of instructing the ASN GW/FA to release the link resource allocated to the terminal and between the ASN GW/FA and the HA providing service for the terminal and to release the link resource between the ASN GW/FA and the terminal respectively further comprises instructing the serving ASN GW to release the link resource allocated to the terminal and between the serving ASN GW and the anchor ASN GW/FA.

9. The method according to claim 8, wherein the process of instructing the serving ASN GW to release the link resource allocated to the terminal and between the serving ASN GW and the anchor ASN GW/FA is:

instructing the serving ASN GW to determine the link allocated to the terminal and between the ASN GW/FA and the terminal according to the terminal identifier of the terminal, the serving ASN GW releasing the link resource and sending a data path release request message to the anchor ASN GW/FA, the data path release request message which carries the terminal identifier of the terminal instructing the anchor ASN GW/FA to determine the link allocated to the terminal and between the serving ASN GW and the terminal according to the terminal identifier of the terminal after receiving the data path release request message, the anchor ASN GW/FA sending a data path release response message to the serving ASN GW after releasing the link resource.

10. The method according to claim 9, wherein the link allocated to the terminal and between the serving ASN GW and the anchor ASN GW/FA is a link R4.

11. The method according to claim 1, wherein the ASN GW/DP is set in the ASN GW/FA, or in an Anchor Authenticator or in a service flow authorization (SFA), or set independently.

12. The method according to claim 1, wherein, if the ASN GW/FA in the ASN to which the terminal attaches comprises the anchor ASN GW/FA and the serving access service network gateway(ASN GW), the ASN GW/DP is set in the serving ASN GW or in the anchor ASN GW/FA or in an anchor authenticator or in a service flow authorization (SFA), or set independently.

13. A system for performing mobile Internet protocol (MIP) deregistering, wherein comprising an access service network gateway/decision point (ASN GW/DP), an access service network gateway/foreign agent (ASN GW/FA), a network element in an access service network (ASN) to which a terminal dominated by the network element in the ASN attaches and a home agent (HA); and wherein the ASN GW/FA is respectively connected to the ASN GW/DP and the network element in the ASN to which the terminal dominated by the network element in the ASN attaches, a message interaction is performed between the network element in the ASN to which the terminal dominated by the network element in the ASN attaches and the ASN GW/FA, the message interaction is performed between the ASN GW/FA and the HA, the system is adapted for sending a notification message of an unconventional termination to the ASN GW/DP if the network element in the ASN to which the terminal dominated by the network element in the ASN attaches has detected the unconventional termination of the terminal; if the ASN GW/DP which has received the notification message determines to release link resource related to the terminal, the ASN GW/DP instructs the ASN GW/FA to release the link resource allocated to the terminal and between the ASN GW/FA and the HA providing service for the terminal and to release the link resource between the ASN GW/FA and the terminal respectively.

14. The system according to claim 13, wherein the ASN GW/DP is set in the ASN GW/FA or in the ASN GW/Anchor Authenticator, or set independently.

15. The system according to claim 14, wherein, if the ASN GW/FA in the ASN to which the terminal attaches comprises an anchor ASN GW/FA and a serving ASN GW, the message interaction is performed between the anchor ASN GW/FA and the serving ASN GW and the ASN GW/DP is set in the serving ASN GW or in the anchor ASN GW/FA, or set independently.

16. The system according to claim 14, wherein the system comprises an anchor authenticator/proxy mobile node connected to the ASN GW/DP, the system adapted for the ASN GW/DP to instruct the anchor authenticator/proxy mobile node to release the link resource allocated to the terminal and between the ASN GW/FA and the HA providing service for the terminal and to release the link resource between the ASN GW/FA and the terminal respectively after the terminal using proxy mobile Internet protocol (PMIP) technique terminates unconventionally when the ASN GW/DP determines to release the link resource related to the terminal.

17. An apparatus for performing mobile Internet protocol (MIP) deregistering, wherein at least comprising an access service network gateway/decision point (ASN GW/DP) adapted to receive a notification message of an unconventional termination, determine to release link resource of a terminal and instruct an access service network gateway/foreign agent (ASN GW/FA) to release the link resource allocated to the terminal and between the ASN GW/FA and a home agent (HA) providing service for the terminal and to release the link resource between the ASN GW/FA and the terminal.

18. The apparatus according to the claim 17, wherein the apparatus is set in the ASN GW/FA and the ASN GW/FA is a serving ASN GW or an anchor ASN GW/FA.

19. The apparatus according to the claim 17, further comprising an algorithm strategy unit adapted to store the algorithm strategy and send the stored algorithm strategy to the ASN GW/DP.

* * * * *